(12) United States Patent
Maritano et al.

(10) Patent No.: US 7,865,047 B2
(45) Date of Patent: *Jan. 4, 2011

(54) WATER-RESISTANT TELECOMMUNICATION CABLE

(75) Inventors: Mauro Maritano, Monza (IT);
Raffaella Donetti, Ghemme (IT);
Antonio Campana, Milan (IT);
Massimiliano Pavan, Verdello (IT);
Raimondo Scordamaglia, Milan (IT)

(73) Assignee: Prysmian Cavi e Sistemi Energia S.R.L., Milan (IT)

( * ) Notice: Subject to any disclaimer, the term of this patent is extended or adjusted under 35 U.S.C. 154(b) by 1057 days.

This patent is subject to a terminal disclaimer.

(21) Appl. No.: 10/500,072

(22) PCT Filed: Dec. 19, 2002

(86) PCT No.: PCT/EP02/14554

§ 371 (c)(1),
(2), (4) Date: Apr. 15, 2005

(87) PCT Pub. No.: WO03/056576

PCT Pub. Date: Jul. 10, 2003

(65) Prior Publication Data

US 2005/0175834 A1    Aug. 11, 2005

Related U.S. Application Data

(60) Provisional application No. 60/345,656, filed on Jan. 8, 2002.

(30) Foreign Application Priority Data

Dec. 28, 2001    (EP) .................................. 01130960

(51) Int. Cl.
*G02B 6/44*    (2006.01)

(52) U.S. Cl. ........................ 385/102; 385/100; 428/375; 428/379

(58) Field of Classification Search ....................... None
See application file for complete search history.

(56) References Cited

U.S. PATENT DOCUMENTS 3,607,812 A    9/1971    Takigawa et al.

(Continued)

FOREIGN PATENT DOCUMENTS

EP    0 458 509 A1    11/1991

(Continued)

OTHER PUBLICATIONS

Chemical Product Property; IRGANOX 1098; Chemical Book, 2007.*

(Continued)

*Primary Examiner*—Jill Gray
(74) *Attorney, Agent, or Firm*—Finnegan, Henderson, Farabow, Garrett & Dunner, L.L.P.

(57) ABSTRACT

Telecommunication cable having an elongated element housing at least one transmitting element. The elongated element has a water-soluble polymeric composition of a vinyl alcohol/vinyl acetate copolymer having a saponification degree of about 60% to about 95%; a plasticizer; a hydrolysis stabilizer compound having a chelant group having two hydrogen atoms bonded to two respective heteroatoms selected from nitrogen, oxygen and sulfur. The two hydrogen atoms have a distance between each other of $4.2 \times 10^{-10}$ m to $5.8 \times 10^{-10}$ m. The stabilizer compound is present in an amount of at least 0.75 mmoles per 100 g of copolymer. The elongated element is in particular a buffer tube housing a plurality of optical fibers. The presence of the stabilizer reduces the increase of the hydrolysis degree of the copolymer upon aging, thus maintaining the desired water blocking properties of the copolymer.

28 Claims, 1 Drawing Sheet

U.S. PATENT DOCUMENTS

| | | | |
|---|---|---|---|
| 3,997,489 A | 12/1976 | Coker | |
| 4,323,492 A | 4/1982 | Zimmermann et al. | |
| 4,469,837 A | 9/1984 | Cattaneo | |
| 4,542,178 A | 9/1985 | Zimmermann et al. | |
| 4,611,019 A | 9/1986 | Lutzmann et al. | |
| 4,622,014 A | 11/1986 | Mikelsaar | |
| 4,781,977 A | 11/1988 | Yagi et al. | |
| 4,812,014 A * | 3/1989 | Sawano et al. | 385/13 |
| 4,837,077 A | 6/1989 | Anton et al. | |
| 4,859,769 A | 8/1989 | Karlsson et al. | |
| 4,877,406 A | 10/1989 | Wilk | |
| 4,906,122 A | 3/1990 | Barrett et al. | |
| 4,980,462 A | 12/1990 | Karlsson et al. | |
| 5,030,103 A | 7/1991 | Buist et al. | |
| 5,134,036 A * | 7/1992 | Uemura et al. | 428/516 |
| 5,137,969 A | 8/1992 | Marten et al. | |
| 5,175,273 A | 12/1992 | Bischofberger et al. | |
| 5,187,086 A | 2/1993 | Janda | |
| 5,187,226 A * | 2/1993 | Kamachi et al. | 525/56 |
| 5,196,404 A | 3/1993 | Maraganore et al. | |
| 5,202,317 A | 4/1993 | Bruice | |
| 5,208,152 A | 5/1993 | Hilvert et al. | |
| 5,250,665 A | 10/1993 | Kluger et al. | |
| 6,350,431 B1 * | 2/2002 | Snow et al. | 424/9.6 |
| 6,577,796 B2 * | 6/2003 | Anelli et al. | 385/112 |
| 7,155,094 B2 * | 12/2006 | Donetti et al. | 385/102 |
| 2002/0041744 A1 | 4/2002 | Anelli et al. | |

FOREIGN PATENT DOCUMENTS

| | | |
|---|---|---|
| EP | 0 635 545 | 1/1995 |
| EP | 0 860 471 | 8/1998 |
| GB | 2 340 835 | 3/2000 |
| WO | WO 00/21098 | 4/2000 |
| WO | WO 00/58768 | 10/2000 |

OTHER PUBLICATIONS

Leach; "Reviews in Computational Chemistry II", Lickowitz et al.; ed., *VCH Publishers*, pp. 1-47, (1991).

Hehre et al.; "Experiments in Computational Organic Chemistry", *Wavefunction, Inc.*, pp. 47-66, (1993).

Zerner; "Reviews in Computational Chemistry II", Lickowitz et al.; ed., *VCH Publishers*, pp. 313-315, (1991).

R. Scordamaglia et al.; "Theoretical Predictive Evaluation of New Donor Classes in Ziegler-Natta Heterogeneous Catalysis for Propene Isospecific Polymerization", Macromol. Theory Simul. 7, pp. 339-405, (1998).

* cited by examiner

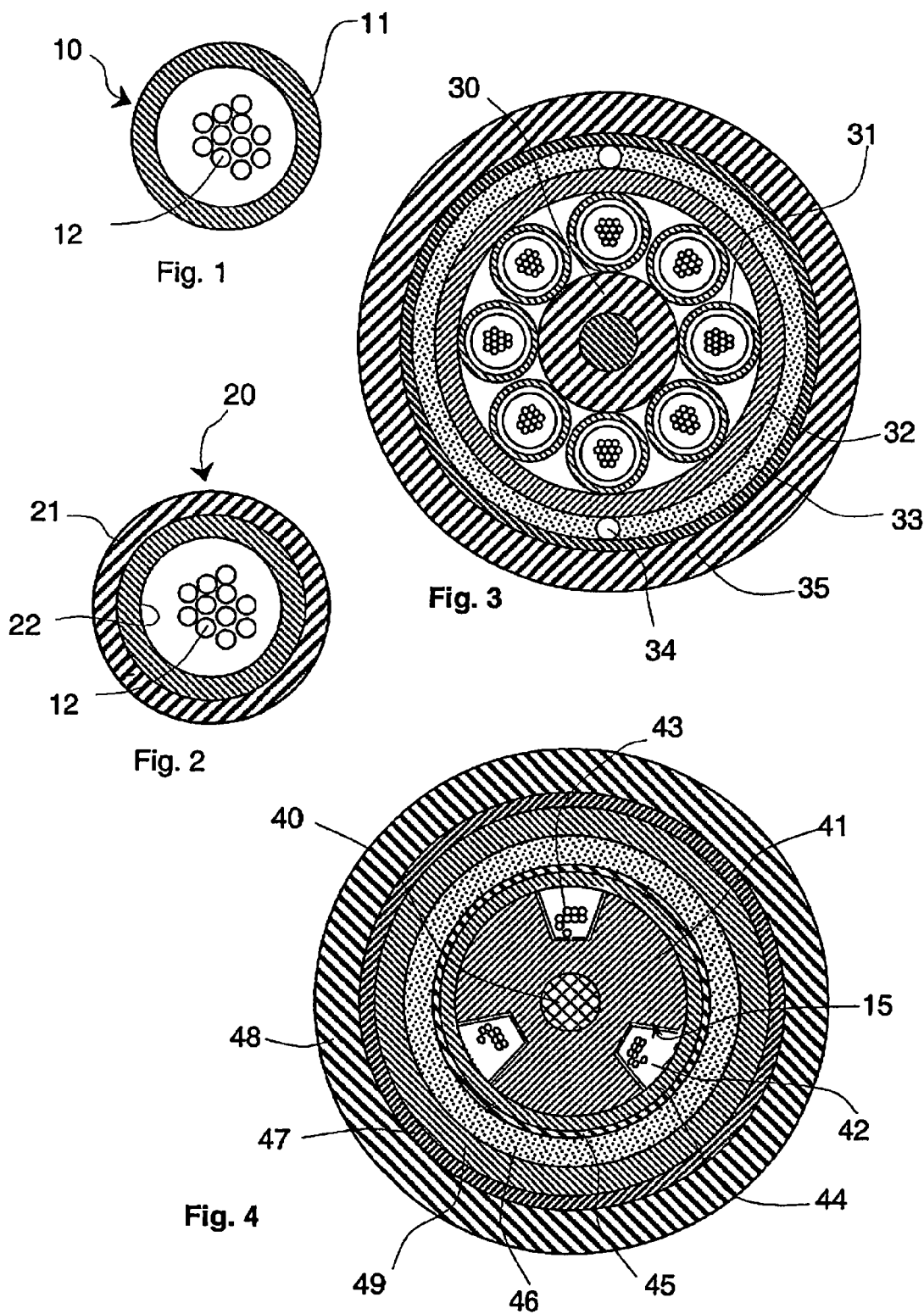

WATER-RESISTANT TELECOMMUNICATION CABLE

CROSS REFERENCE TO RELATED APPLICATIONS

This application is a national phase application based on PCT/EP02/14554, filed Dec. 19, 2002, the content of which is incorporated herein by reference, and claims the priority of European Patent Application No. 01130960.6, filed Dec. 28, 2001, and the benefit of U.S. Provisional Application No. 60/345,656, filed Jan. 8, 2002.

BACKGROUND OF THE INVENTION

1. Field of the Invention

The present invention relates to telecommunication cables, in particular optical fiber cables, comprising elongated elements, in particular buffer tubes, which are capable of blocking a flow of water accidentally penetrated therein.

2. Background Art

International patent application WO 00/21098, in the name of the same Applicant and herein incorporated by reference, discloses elongated solid elements housing at least one optical fiber therein, said elements being made from a water soluble material which, upon being contacted by water, dissolves at least in part and forms a viscous solution of suitable viscosity capable of stopping the longitudinal flow of water along said element. The use of buffer tubes of this kind allows to avoid the use, or at least substantially reduce the amount, of conventional water-blocking means, such as grease-like material, water-swellable powders and the like.

In particular, said element is preferably a buffer tube and is preferably made from a vinyl alcohol/vinyl acetate copolymer (VA-VAc copolymer), generally identified in the art as polyvinylalcohol. These copolymers are generally obtained from partial or complete hydrolysis (i.e. saponification) of the acetate groups of a polyvinyl acetate polymer. Thus, these materials are generally identified by their hydrolysis (or saponification) degree, i.e. the percentage of acetate groups which has been hydrolyzed from the initial vinylacetate polymer. Typically, VA-VAc copolymer having a hydrolysis degree of 98% or higher are considered substantially completely hydrolyzed (or saponified), and are thus referred to as substantially completely hydrolyzed (or saponified) polyvinylalcohol.

As mentioned in WO 00/21098, the water-blocking capacity of the VA-VAc copolymer depends, among other properties, also from the degree of hydrolysis of the material. In particular VA-VAc copolymers completely hydrolyzed are almost insoluble in water, thus being substantially prevented from forming the desired water-blocking viscous solution. Accordingly, WO 00/21098 suggests to employ VA-VAC copolymers having a hydolysis degree of from about 50% to 95%, preferably from 70% to about 90%.

The Applicant has now observed that, while a buffer tube made from said VA-VAC copolymer solves the problem of effectively stopping a flow of water accidentally penetrated inside the cable, its water blocking properties may be impaired upon aging.

In particular the Applicant has observed that, as a consequence of the aging of the material, the water blocking properties of the material can be impaired due to hydrolysis of the acetic groups of the copolymer. In particular, the degree of hydrolysis of the VA-VAc copolymer may increase to such an extent as to severely limit the water blocking properties of the material.

In the art it is known to add compounds (e.g. antioxidants and/or thermal stabilizers) to polymeric compositions, to avoid oxidation and thermal degradation which may occur, for instance, at the high temperatures during the processing of the material, e.g. during the extrusion process. These additives are however generally employed in very limited amounts. For instance, European patent EP 0 458 509 discloses oxidation resistant ethylene/vinyl-alcohol copolymer compositions, having a saponification degree higher than 90%, preferably higher than 95% and comprising 0.01% to 0.5% w/w of a hindered phenolic antioxidant.

The Applicant has now found that the negative aging phenomena of a VA-VAC copolymer can be avoided or at least substantially reduced by adding to said copolymer an effective amount of a hydrolysis stabilizer compound having a specific chelant structure, capable of chelating those site on the VA-VAc copolymer chain which are deemed responsible for the hydrolysis phenomena upon aging.

SUMMARY OF THE INVENTION

A first aspect of the present invention thus relates to a telecommunication cable, in particular an optical fiber cable, comprising an elongated element housing at least one transmitting element, said elongated element comprising a water-soluble polymeric composition which comprises:

a vinyl alcohol/vinyl acetate copolymer having a saponification degree of from about 60% to about 95%;

a plasticizer;

a hydrolysis stabilizer compound comprising a chelant group comprising two hydrogen atoms bonded to two respective heteroatoms selected from nitrogen, oxygen and sulphur?, said two hydrogen atoms having a distance between each other of from $4.2 \times 10^{-10}$ m to $5.8 \times 10^{-10}$ m, preferably of from $4.5 \times 10^{-10}$ m to $5.5 \times 10^{-10}$ m, said stabilizer compound being present in an amount of at least 0.75 mmoles per 100 g of VA-VAC copolymer.

Preferably the amount of said chelant group is of at least 0.8 mmoles, more preferably of at least 1.0 mmoles, per 100 g of VA-VAc copolymer. Said amount is preferably lower than about 3.5 mmoles, more preferably lower than about 3.0 mmoles, of chelant group per 100 g of VA-VAc copolymer.

Preferably, said two heteroatoms forming said chelant group are nitrogen atoms. More preferably, said two nitrogen atoms are included in two respective amide moieties of formula —CO—NH—.

The amount of VA-VAc copolymer is preferably from about 50% to about 95% of the total weight of the polymeric composition, more preferably from about 60% to 85.

Preferably said plasticizer is present in an amount of from 5 to 30 parts by weight per hundred parts by weight of the VA-VAc copolymer, more preferably from 10 to 25 parts.

Said stabilizer compound is preferably a compound of formula I:

$$R^2\text{---}X^1\text{---}R^1\text{---}X^2\text{---}R^3 \qquad (I)$$

wherein $R^1$ represents a linear or branched $C_1$-$C_{10}$ alkylene, optionally substituted with one or two groups selected from alkyl substituted or unsubstituted phenyl, benzyl or hydroxyphenyl;

$X^1$ and $X^2$ each independently represent a moiety comprising a heteroatom-bonded hydrogen selected from —NH—, —CO—NH—, —CH(OH)— or —CH(SH)—;

each of $R^2$ and $R^3$ independently represent a linear or branched $C_1$-$C_{10}$ alkyl, optionally substituted with a group selected from alkyl substituted or unsubstituted phenyl, benzyl or hydroxyphenyl.

In particular, the combination of groups $R^1$, $R^2$ and $R^3$ is selected in order to determine energetically feasible conformations of the molecule, wherein the distance between the heteroatom-bonded hydrogen atoms of $X^1$ and $X^2$ is as above identified.

Preferably $R^2$ and $R^3$ each independently represent a moiety of formula

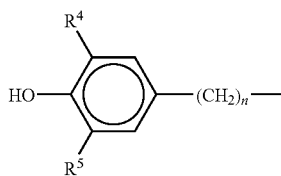
(II)

wherein $R^4$ and $R^5$ independently represent a $C_1$—$C_6$ linear or branched alkyl moiety, preferably t-butyl, and n is an integer from 0 to 6, preferably 2.

Preferably $R^1$ is a linear $C_2$-$C_{10}$ alkylene, more preferably a $C_6$ alkylene.

Preferably said heteroatom moieties $X_1$ and $X_2$ are amde groups of formula —CO—NH—.

According to a particularly preferred embodiment, said stabilizer compound is N,N'-esan-1,6-dillibis[3,5-di-ter-butyl-4-hydroxyphenyl)proplonamide].

Alternatively, said stabilizer compound can be an oligomer or polymer formed by a plurality of monomeric units, each of said monomeric unit comprising at least one heteroatom-bonded hydrogen atom, wherein the energetically feasible conformations of the molecule provide a distance between two of said heteroatom-bonded hydrogen atoms of two respective monomeric units as above identified. For instance, said stabilizer compound can be a poll L-aminoacid of formula (III):

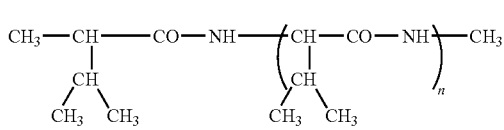
(III)

where n is an integer from 1 to 5.

Preferably said VA-VAc copolymer has a hydrolysis degree of from about 70% to about 92%, more preferably from about 70% to about 90%.

According to a preferred embodiment, said elongated element containing the at least one optical fiber is a tubular element comprising at least one sheath made from said water-soluble polymeric composition.

Preferably, said tubular element comprises a double layer sheath in which the inner sheath is made from said water-soluble polymeric composition and the outer sheath is made from a conventional water-insoluble polymer material, preferably polyethylene.

According to a further preferred embodiment, the said tubular element comprises a third outer sheath made of water-soluble polymeric composition as above defined.

According to an alternative embodiment, said elongated element is a grooved core comprising at least one groove longitudinally disposed on the outer surface of said core and housing said at least one optical fiber. According to an embodiment of the present invention, at least the walls of said groove are made from a water-soluble solid polymer composition. According to an alternative embodiment, said grooved core is made completely from said water-soluble solid polymer composition.

According to another alternative embodiment, the element made of water-soluble solid material included in a cable according to the present invention is a tape.

For the purpose of the present invention, the term "transmitting element" includes within its meaning any element capable of transmitting a signal, particularly optical fibers, including individual optical fibers, ribbons or bundles of optical fibers, either as such or protected by a polymeric sheath. Non limiting examples of optical fibers are, for example, single-mode fibers, multi-mode fibers, dispersion-shifted (DS) fibers, non-zero dispersion (NZD) fibers, or fibers with a large effective area and the like, depending on the application requirements of the cable. They are generally fibers with an outside diameter of between 230 and 270 μm.

BRIEF DESCRIPTION OF THE DRAWINGS

FIG. 1 shows a cross-sectional view of an elongated element for a cable according to the invention.

FIG. 2 shows a cross-sectional view of an alternative elongated element for a cable according to the invention.

FIG. 3 shows a cross-sectional view of an cable according to the invention.

FIG. 4 shows a cross-sectional view of an alternative embodiment of a cable according to the invention.

DESCRIPTION OF PREFERRED EMBODIMENTS

FIG. 1 shows an example of an elongated element comprised in a cable according to the invention. In this embodiment, said element is a tubular element in particular a buffer tube 10, which comprises a polymeric sheath 11 which envelopes a plurality of transmitting elements 12. The polymeric sheath 11 is made from a water-soluble polymeric material as above defined. Transmitting elements are preferably optical fibers which can be disposed inside the tube either individually, as ribbons or grouped into bundles. Bundles of optical fibers (e.g. twelve) may also be semi-tightly enveloped by a so-called microsheath, i.e. a sheath of polymeric material (e.g. ethylene-propylene copolymer) having a thickness of about 0.15 mm, to form microtubes which are disposed within buffer tube 10. If desired, said microtubes may contain waterblocking means, in the form of grease like filler or preferably in the form of water swellable powder compositions. For instance a composition comprising a mixture of polyacrylate water swellable particles and inert talc particles, as described in International Patent Application WO 00/58768, herein incorporated by reference, can be used. If desired, some of the optical fibers housed inside said buffer tube can be replaced by non-transmitting glass fibers, in order to reach the optimal count within the tube, without varying the dimensions of the tube.

FIG. 2 shows a preferred embodiment of an elongated element comprised in a cable according to the invention. Buffer tube 20 comprises a double layer sheath, where the outermost sheath 21 is made from a conventional polymer material. Conventional polymer materials are, for instance polyethylene, ethylene-propylene copolymers, polypropylene or polybutyleneterephtalate. Preferably polyethylene, in particular high density polyethylene, is employed. The innermost sheath 22, enveloping a plurality of transmitting elements 12 as above defined, is made from a solid water-soluble polymer composition as described above. A buffer tube 20 can be manufactured according to conventional extrusion techniques for manufacturing double-layer sheaths, such as, for instance, co-extrusion.

The internal diameter of buffer tubes 10 or 20 is preferably from about 1.5 mm to about 2.0. The thickness of the sheath comprising the water-soluble polymer composition is preferably from about 0.2 to about 0.3 mm. The thickness of the outer polymeric layer 21 is preferably from about 0.2 to about 0.4 mm.

FIG. 3 shows an example of a cable according to the invention, comprising a supporting element 30, preferably made from a central reinforcing element, typically made of glass resin, coated with a layer of polymer, e.g. polyethylene.

The cable has one or more buffer tubes 31, wound around the supporting element 30. The buffer tubes are like those illustrated in FIG. 1 or preferably in FIG. 2. Where appropriate, buffer tubes 31 may further comprise an outer layer comprising the water-blocking material.

The number of buffer tubes (which may also be arranged on several layers) and their dimensions depend on the intended capacity of the cable, as well as on the conditions of use of this cable.

For example, cables are envisaged with only one tubular element (in which case the central element 30 is not present), and cables are envisaged with six, eight or more buffer tubes, wound in one or more layers (for example up to 24 tubular elements bundled on two layers).

The buffer tubes 31 are in turn held together by a containing layer 32, for example a wrapped polymeric tape, and are preferably surrounded by a reinforcing element 33, for example a layer of Kevlar® fibres or of glass yarn, the size of which depends on the mechanical strength requirements of the cable. If desired, the containing layer 32 can be made (entirely or partly) by wrapping with a tape of water-blocking polymer composition as above defined, or alternatively with an extruded layer of the same composition.

Two sheath-dividing filaments 34, arranged longitudinally with respect to the cable, can be included within the reinforcing layer 33.

The cable then comprises a protective outer sheath 35, typically made of polyethylene, preferably medium density polyethylene. In relation to specific requirements, further protective layers can also be present, for example of metal layers, either inside or outside the structure described.

FIG. 4 shows another embodiment of a cable according to the invention, of the slotted core type. Said cable comprises, in its radially innermost position, a reinforcing element 40 made, for example, of glass resin, on which is present a grooved (or slotted) core 41 (which is typically extruded on the reinforcing element), made of water-soluble polymer composition according to the invention. The grooves 42 extend in a continuous helix or in an alternating s-z path all the way along the entire outer surface of the said core, in order to house the optical fibres 43 therein; in a similar manner to that mentioned above, the optical fibres can be arranged individually or assembled in ribbons, mini-tubes and the like, loosely (i.e. with an excess of length) or tightly at the bottom of the grooves.

According to an alternative embodiment, said grooved core can be made only in part from the water-soluble polymer composition. In this case, a double layer grooved core is manufactured (e.g. by double-extrusion or co-extrusion of the two polymer layers), wherein the inner portion of the core is made from a conventional polymer material (e.g. PE or PP) and the outer grooved portion is made from a water soluble polymer composition according to the invention.

Alternatively, the grooved core can be made entirely from a conventional material, such as PE or PP. In this case, U-shaped elongated elements made of water-soluble composition can be placed in its grooves, it being possible, for example, for these elements to be co-extruded with the grooved core or produced separately and subsequently inserted into the grooves.

As an example, the grooved core can be between 4 and 12 mm in diameter and can comprise from 1 to 10 grooves, depending on the capacity of the desired cable. The dimensions of the grooves themselves are determined by the number of fibres present therein (which may be assembled as tapes of fibres) and by the degree of freedom envisaged for these fibres.

The grooved core 41 is then coated with a layer 44 of polymer, preferably comprising said water-soluble composition, which closes off the grooves; this coating can be made either in the form of an extruded sheath or as a longitudinal or helical wrapping.

This layer can in turn be surrounded by a further reinforcing tape 45 made, for example, of polyester, and is then surrounded by a reinforcing layer 46 or armouring made, for example, of Kevlar®, which can incorporate filaments or rods made of solid, water-soluble composition.

A further wrapping 47 made, for example, of polyester surrounds the armouring 46 and is in turn encircled by an outer sheath 48 typically made of polyethylene, particularly MDPE; a layer of water-soluble polymer composition 49 can be placed under the outer sheath 48, e.g. as a wrapped tape or as extruded sheath, and in all of the zones which can conceivably be reached by water.

The VA-VAc copolymer comprised in an elongated element according to the invention, is preferably selected among those having a degree of hydrolysis of from about 60% to about 95%, more preferably from about 70% to about 92%, much more preferably from about 70% to about 90%.

Furthermore, it is also preferable to use a vinyl alcohol/vinyl acetate copolymers with a viscosity index of greater than about 10. Preferably, the viscosity index of the copolymer is between about 12 and about 40, vinyl alcohol/vinyl acetate copolymers with a viscosity index of between about 15 and about 35 being particularly preferred. Advantageously, it is possible to use mixtures of copolymers with different viscosity indexes (i.e. different molecular weights), so as to combine the specific advantageous effects of each copolymer.

Examples of commercially available materials with the desired properties are those sold under the trade name Mowlol® (Hoechst AG), Gohsenol® (Nippon Gohsel), Elvanol® (Du Pont) or Airvol® (Air Products).

The amount of VA-VAc copolymer in the polymeric composition forming said elongated element is preferably from about 50% to about 95% of the total weight of the polymeric composition, more preferably from about 60% to 85.

As previously mentioned, the Applicant has found that a VA-VAc copolymer forming an elongated element according to the invention can be protected against the aging effects caused by hydrolysis phenomena, by adding an effective amount of a hydrolysis stabilizer compound comprising at least two hydrogen atoms bonded to two respective heteroatoms selected from nitrogen, oxygen and sulphur, said at least two hydrogen atoms having a distance of from $4.2 \times 10^{-10}$ m to $5.8 \times 10^{-10}$ m, preferably of from $4.5 \times 10^{-10}$ m to $5.5 \times 10^{-10}$ m.

Although not willing to be bound to any particular theory, the Applicant is of the opinion that a compound with the above features is capable of effectively interacting with the polymeric chain of the VA-VAc copolymer in order to limit the hydrolysis of the residual acetate groups.

In particular, the distance between said hydrogen atoms in the energetically feasible conformations (particularly in the lowest energy conformation) of the molecule of the stabilizer compound, should be capable of forming hydrogen bonds with two respective oxygen atoms of the VA-VAc copolymer having a distance between about $4.5 \times 10^{-10}$ m to $5.5 \times 10^{-10}$ m.

As previously mentioned, the VA-VAc copolymer is generally obtained by hydrolysis of polyvinylacetate, by which the acetate groups of the polymer are converted to hydroxy groups. More specifically, the reaction is typically an alcoholysis of polyvinylacetate with a metal (typically sodium) hydroxide as catalyst. The VA-VAc copolymer resulting from the alkaline alcoholysis has mainly a block structure, where blocks formed by sequences of vinyl-acetate groups of formula —$CH_2$—$CH(OCOCH_3)$— are alternated to blocks formed by sequences of vinyl-alcohol groups of formula —$CH_2$—$CH(OH)$—.

As observed by the Applicant, upon aging and in presence of humidity, the hydrolysis reaction on a partially hydrolyzed VA-VAC copolymer tends to continue with consequent formation of acetic acid, which in turn acts as a catalyst of the hydrolysis reaction. Due to the block structure of the VA-VAc copolymer, the Applicant is of the opinion that the acetate groups which are more prone to the hydrolysis attack (i.e. which require less activation energy) are those of the terminal vinylacetate moieties of each vinylacetate block.

The Applicant has then determined by means of structural analysis, that the interatomic distances between the different oxygen atoms of the acetate and hydroxy groups at the interface of the respective block-terminal vinylacetate and vinylalcohol groups are comprised between 4.5 and 5.4 Angstrom ($10^{-10}$ m) in the most probable energetically feasible conformations of the VA-VAc copolymer.

As experimentally determined by the Applicant, a chelant molecule having two heteroatom-bonded hydrogen atoms at a suitable distance, i.e. comparable with those determined between the above mentioned oxygen atoms of the VA-VAc copolymer, is capable of effectively preventing the hydrolysis attack on the VA-VAc copolymer chain. It is in fact believed that these two heteroatom-bonded hydrogen atoms are capable of forming hydrogen bonds with respective oxygen atoms on the VA-VAc copolymer chain, thus creating a chelated structure at the interface between a vinylacetate and a vinylalcohol block, which effectively protects the acetate group from hydrolytic attack.

As a matter of fact, other compounds generally employed as antioxidants, which do not however show the above interatomic distance between two heteroatom-bonded hydrogen, do not explicate the desired aging-protective effect against hydrolysis of the acetate groups.

Determining the distance between atoms is within the skill in the art. For instance, software with which such determinations are optionally made includes CAChe software commercially available from CAChe Scientific, Inc.; PCMODEL software commercially available from Serena Software; HSC Chemistry for Windows, or PCMODEL software commercially available from AR Software; INSIGHT II, DISCOVER, and LUDI software commercially available from BIOSYM; SYBYL, RECEPTOR, and DISCO software commercially available from Tripos Associates, Inc.; and New Chem-X commercially available from Chemical Design, Inc.

Examples of such modeling include those disclosed in U.S. Pat. Nos. 5,187,086; 5,250,665; 4,859,769; 5,208,152; 4,980,462; 5,202,317; 5,196,404; 4,781,977, and 5,175,273. Alternatively, X-ray crystallography data can be used to ascertain distances. The crystallography data is preferably input to a programmed computer or microprocessor to determine distances. Alternatively, molecular models can be used to determine interatomic distances when the models are dimensionally correct. Examples of such modeling include those disclosed in U.S. Pat. Nos. 4,877,406; 4,906,122; 4,622,014, and 5,030,103. Because of speed and accuracy, determining distances using a programmed computer or microprocessor is preferred.

It is within the skill in the art that such distances are determined at energetically feasible conformations, preferably the lowest energy conformation. An energetically feasible conformation is a conformation having a heat of formation within about 1.5 KCal (6285 Joule (J)) of the heat of formation of the lowest energy conformation. Ascertaining the lowest conformation in the energetically feasible conformation is within the skill in the art as shown by such references as Reviews in Computational Chemistry II, Lickowitz et al. ed., VCH Publishers, 1991, pp. 1-47 and Hehre et al., Experiments in Computational Organic Chemistry, Wavefunction, Inc., 1993, pp. 47-66. Software is advantageously used in calculating these conformations. Software is also advantageous in calculating heats of formation of each conformation and the distances between atoms. The lowest energy conformation and energetically feasible conformations are preferably determined by means known as (a) semiclassical (model), harmonic, or molecular mechanical; (b) semiempirical quantum mechanical; and/or (c) ab initio quantum mechanical methods.

These methods are within the skill in the art as shown by Reviews in Computational Chemistry II, Lickowitz et al. ed., VCH Publishers, 1991, pp. 313-315.

It is also within the skilled in the art (see e.g the article from R. Scordamaglia and L. Barino "Theoretical predictive evaluation of new donor classe in Ziegler-Natta heterogeneous catalysis for propene specific polymerization", Macromol. Theory simul., 7, 399-405, 1998) the use of statistical methods applied to the molecular modelling analysis, for assigning probabilistic weights to each of the determined energetically feasible conformations. Upon identification of a specific molecular parameter (such as the interatomic distance between two atoms of the molecule, as in this case), it is then possible to calculate the probability of a selected value (or range of values) of said parameter being present in said molecule, as the sum of each probability assigned to the respective energetically feasible conformations showing said selected value of said parameter.

Preferred hydrolysis stabilizer compounds are those of formula (I) previously indicated, showing the above distance between the two heteroatom-bonded hydrogen atoms.

Examples of suitable compounds falling within the compounds defined by formula I are the following:

$CH_3$—CO—NH—$CH_2$—$CH_2$—C($CH_2$-phenyl)$_2$—$CH_2$—$CH_2$—NH—CO—$CH_3$

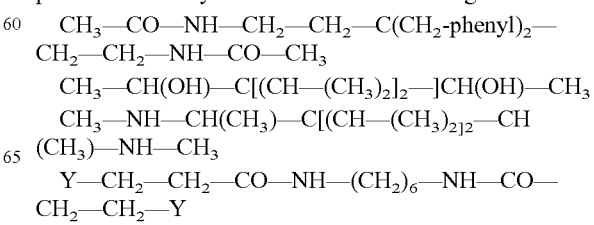

where Y is

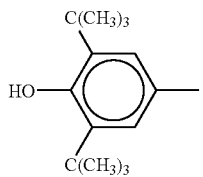

Among those compounds of formula I, particularly preferred are those comprising at least one and preferably two hindered phenols, i.e. a pheno, group with sterically bulky substituents located ortho to the OH moiety. Said hindered phenols are preferably comprised in the $R^2$ and $R^3$ substituents of the compound of formula I. Examples of suitable hindered phenols are those of formula:

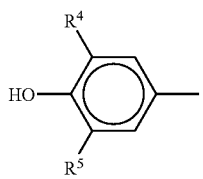

wherein $R^4$ and $R^5$ independently represent a $C_1$-$C_6$ linear or branched alkyl moiety, preferably t-butyl.

The presence of the hindered phenols in the stabilizer compound may contribute to the confer (additional) thermal and oxidative stability to the polymeric mixture during processing of the material.

Further preferred compounds are those compounds of formula I wherein the $X_1$ and $X_2$ moieties are —CO—NH— group.

A particularly preferred stabilizer compound is N,N'-esan-1,6-diilbis[3,5-di-ter-butyl-4-hydroxyphenyl)propionamide].

An example of a suitable commercially available material is Irganox 1098 (Ciba Geigy).

As the effect of the stabilizer depends from the chelant group formed by the two heteroatom-bonded hydrogen atoms, it is convenient to express the amount of stabilizer to be added to the VA-VAc copolymer as the millimoles of chelant groups for 100 grams of VA-VAc copolymer. In case of a molecule of stabilizer bearing a single chelant group (such as those compounds of formula I), the millimoles of chelant groups correspond to the millimoles of compound. As observed by the applicant, an amount of stbilizer of at least 0.75 mmoles per 100 g of VA-VAc copolymer, preferably of at least 0.8 mmoles, is advantageous to achieve an effective stabilization of the VA-VAc copolymer. Much more preferably, said amount is of at least 1.0 mmoles of chelant groups per 100 g of VA-VAc copolymer.

The Applicant has further observed that while the amount of the hydrolysis stabilizer should be sufficiently high for resulting in the desired stabilizing effect, it is however advisable to avoid excessive amounts of this additives, thus keeping said amount below the above indicated maximum amount. As a matter of fact, excessive amounts of stabilizer, particularly when the heteroatom groups $X_1$ and $X_2$ are amine groups, may cause undesirable cross-linking reactions in the VA-VAc copolymer, with consequent difficulties in processing the material. The amount of stabilizer should thus preferably be lower than about 3.5 mmoles of chelant groups per 100 g of VA-VAC copolymer, more preferably lower than about 3.0 mmoles.

For instance, the Applicant has found that if N,N'-esan-1, 6-diilbis[3,5-di-ter-butyl-4-hydroxyphenyl)propionamide] (Irganox 1098, Ciba Geigy) is used as stabilizer compound, it is preferable to use from about 0.78 to about 3.2 mmoles of compound (which comprises a single chelant group) per 100 g of VA-VAC copolymer. This amount corresponds to an amount from about 0.5% to about 2.0% by weight with respect to the total weight of VA-VAc copolymer (0.5 to 2.0 phr).

Further to the excessive amount of stabilizer, undesirable cross-linking of the VA-VAc copolymer can also take place during the mixing of the VA-VAc copolymer with the stabilizer compound, if to much energy (heat or mechanical) is transferred to the polymer during the mixing. The stabilizer should thus preferably be admixed by controlling the energy transfer, e.g. as indicated in U.S. Pat. No. 5,137,969, herein incorporated by reference. Preferably a co-rotating twin screw extruder is used.

The addition of a stabilizer compound as above defined allows thus to reduce the negative effects of aging on the VA-VAc copolymer, in particular by reducing the hydrolysis phenomena of the acetate groups. The reduction of the hydrolysis phenomena determines in fact a reduced increase in the hydrolysis degree of the material, which may thus perform its water-blocking function also after aging.

In the practice, a VA-VAc copolymer is commonly identified by means of its saponification number, which corresponds to the mg of KOH which are necessary to hydrolyzed one gram of VA-VAc copolymer. The hydrolysis degree (HD) is correlated to the saponification number (SN) of the VA-VAc copolymer through the following formula:

$$HD = 100 \cdot \frac{100 - 0.1535 \cdot SN}{100 - 0.0749 \cdot SN}$$

where the hydrolysis degree is expressed as the mole % of hydrolyzed vinylacetate groups.

On polymeric compositions comprising a VA-VAC copolymer, it is generally easier to measure the saponification number of the whole composition (i.e. on the whole weight of the composition), which will thus be lower than the saponification number of the only VA-VAC copolymer comprised in the composition. If necessary, by knowing the weight percentage of VA-VAC copolymer in the compositions, it is possible to calculate the saponification number of the VA-VAc copolymer and then, according the above formula, the respective hydrolysis degree.

The polymeric mixture may further comprise conventional additives such as platicizers, oxidation/thermal stabilizers, biocides, processing aids, pigments and the like.

The amount of plasticizer is preferably from about 5% to about 30% by weight with resepect to the weight of VA-VAc copolymer, more preferably from about 10% to about 25%.

Examples of suitable materials which can be used as plasticizers are glycerol, sorbitol, trimethylolpropane, low molecular weight polyglycol, such as polyethylene glycol (e.g. di- or tri-ethyleneglycol), pentaerythritol, neopentylglycol, triethanolamine or oxyethylated phosphoric esters.

Whilst the hydrolysis stabilizer of the present invention may include in the preferred embodiment a hindered phenolic group capable of limiting the oxidation phenomena and thermal degradation which may occur at the high temperatures during the processing of the material, nevertheless it may be advantageous to add to the polymeric mixture small amounts of an oxidation/thermal stabilizer, e.g. In an amount of from about 0.05 to about 0.5. Examples of suitable oxidation/thermal stabilizer are hindered phenolic antioxidants, such as those commercialized under the tradename Irganox by Ciba.

The following non-limitative examples are given for better illustrating the invention.

EXAMPLES

Example 1

Preparation of VA-VAC Copolymer Compositions

The hydrolysis stabilizing effect of different additives and different amounts of said additives has been verified on a polyvynilalcohol composition comprising a Mowlol 26/88 (Clariant) as VA-VAc copolymer and 25 phr of glycerol as plasticizer, extruded in a conventional manner to form buffer tubes.

The following additives of the hindered phenolic type have been used:

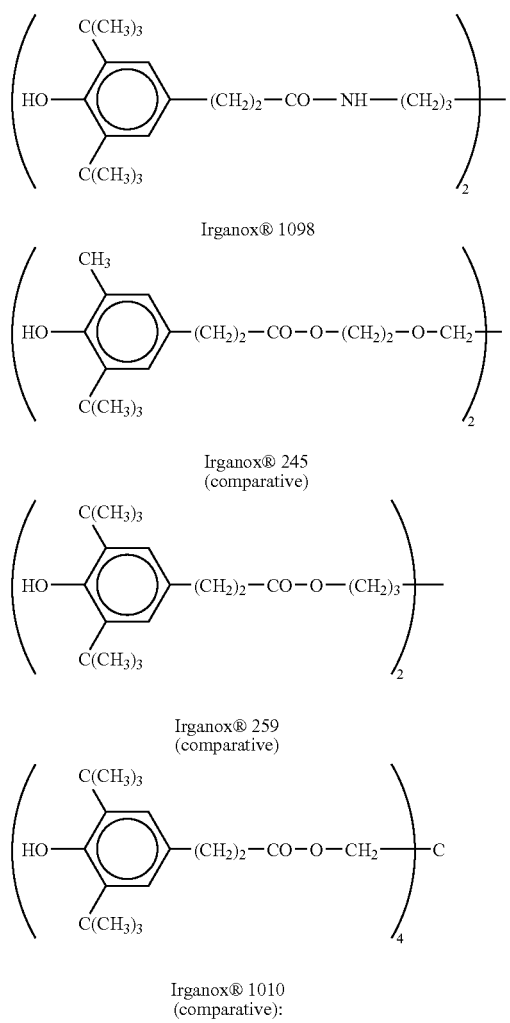

Four polymeric compositions have been prepared by adding an amount of 1 phr of the above additives to the initial VA-VAC copolymer composition (i.e. 1 part of additive per 100 part by weight of VA-VAc copolymer). For Irganox 1098, this amount corresponds to 1.57 mmoles of compound per 100 g of VA-VAc copolymer.

Two further comparative composition have been prepared by mixing and granulating as above the initial VA-VAC copolymer composition, but adding to the VA-VAC copolymer and plasticizer:

0.1 phr of Irganox 245; or
0.1 phr of Irganox 245 and 0.32 phr of HMBA (corresponding to 1.57 mmoles per 100 g of VA-VAc copolymer);
where HMBA is the acronym indicating hexamethylenbisacetamide:
$CH_3$—CO—NH—$(CH_2)_6$—NH—CO—$CH_3$.

The six compositions are identifed as follows:

| Composition | Additive |
|---|---|
| 1 | Irganox 1098 |
| 2* | Irganox 245 (0.1 phr) |
| 3* | Irganox 245 |
| 4* | Irganox 259 |
| 5* | Irganox 1010 |
| 6* | HMBA + Irganox 245 |

*comparative

The composition have been prepared feeding a blend with a gravimetric feeder comprising 100 parts of Mowlol 26/88 and the additive into a 30 mm co-rotating twin screw extruder (35 L/D long, vent at the 25 diameter position) and injecting 25 parts of glycerol at the 8 diameter position. Operating conditions were as follows:

screw speed: 100 rpm
production rate: 10 kg/h
melt temperature (at the exit from the extruder: 200° C.
specific energy input: 0.13 KW h/kg The strands were cooled in air and granulated into pellets. The pellets have been subsequently extruded in the form of e buffer tube (outside diameter 2.1 mm, thickness 0.25 mm) according to conventional extrusion techniques.

The so obtained buffer tubes were tested for measuring the number of saponification according to the following procedure.

Specimens of tubes of a weight about 1.0 g have are previously treated under a flow of 280 Nl/h of nitrogen for 1 h at the temperature of 180° C. for removing possible amounts of free acetic acid. The number of saponification has been determined as follows.

The specimens so treated is accurately weighed on analytical weight, inserted into a 500 ml flask, added with 100 ml of distilled water, and the mixture is stirred under moderate heating up to dissolution of the specimen.

25.0 ml of 0.1 N potassium hydroxide solution are then added to the mixture, together with few drops of indicator, and the solution is stirred while heating to reflux for one hour.

A blank test is conducted in parallel, with the same amount of reactants, but without the polymeric material.

Titration is effected with a 0.1 N solution of sulfuric acid.

The saponification number (i.e. the grams of reacted potassium hydroxide per gram of polymeric material) is calculated as follows:

$$\text{Saponification No.} = 5.61(PB-P)/g$$

where PB are the ml of sulfuric acid solution used in the blank test, P are the ml of sulfuric acid used for the test with the polymer and g are the grams of polymeric composition.

TABLE 1

| Saponification number after extrusion | |
| --- | --- |
| Composition | Saponification No. |
| 1 | 112.9 |
| 2 | 112.3 |
| 3 | 113.1 |
| 4 | 109.6 |
| 5 | 112.1 |
| 6 | 108.6 |

As shown by the above table, no substantial variation in the saponification number of the different compositions is observed on the non-aged compositions.

Example 2

Specimens of the buffer tubes obtained according to example 1 has then been subjected to accelerated aging, by introducing the specimens into an oven under controlled relative humidity (50%) at a temperature of 85° C. for 30 days.

At the end of the aging test, the saponification number of each specimen has been measured according to the methodology described in example 1. Table 2 shows the results of the measurement, with the percentage variation of the saponification number with respect to the one of non-aged specimen reported in table 1.

TABLE 2

| Saponification number after aging | | |
| --- | --- | --- |
| Composition | Saponification number | % variation of saponification no. |
| 1 | 105.7 | 6.3 |
| 2 | 96.7 | 13.9 |
| 3 | 97.9 | 13.4 |
| 4 | 96.1 | 12.3 |
| 5 | 95.5 | 14.8 |
| 6 | 94.4 | 13.1 |

From the above table, it can be appreciated that while other conventional hindered phenolic antioxidants are not able to limit the increase of hydrolysis degree (i.e. the reduction of the saponification number) of the VA-VAc copolymer, an effective amount of a compound as illustrated in the foregoing of the present specification substantially limits the hydrolytic degradation of the polymer material.

Two further test have been performed by varying the amount of Irganox 1098 in a composition as previously illustrated. In particular, an amount of 0.5 phr (0.78 mmoles per 100 g of VA-VAc copolymer) and of 0.1 phr have been used. In the first case, the variation of the saponification number was of about 9.5%, while in the second case of about 12.1%.

The invention claimed is:

1. A telecommunication cable comprising an elongated element housing at least one transmitting element, said elongated element comprising a water-soluble polymeric composition which comprises:
a vinyl alcohol/vinyl acetate copolymer having a saponification degree from about 60% to about 95%;
a plasticizer; and
a hydrolysis stabilizer compound comprising a chelant group comprising two hydrogen atoms bonded to two respective heteroatoms selected from nitrogen, oxygen and sulfur, said two hydrogen atoms having a distance between each other of $4.2 \times 10^{-10}$ m to $5.8 \times 10^{-10}$ m, said stabilizer compound being present in an amount of at least 0.75 mmoles per 100 g of copolymer.

2. The telecommunication cable according to claim 1, wherein the amount of said hydrolysis stabilizer compound comprising a chelant group is at least 0.8 mmoles per 100 g of said copolymer.

3. The telecommunication cable according to claim 1, wherein the amount of said hydrolysis stabilizer compound comprising a chelant group is at least 1.0 mmoles per 100 g of said copolymer.

4. The telecommunication cable according to claim 1, wherein the amount of said hydrolysis stabilizer compound comprising a chelant group is lower than about 3.5 mmoles per 100 g of said copolymer.

5. The telecommunication cable according to claim 1, wherein the amount of said hydrolysis stabilizer compound comprising a chelant group is lower than about 3.0 mmoles per 100 g of copolymer.

6. The telecommunication cable according to claim 1, wherein said two heteroatoms forming said chelant group are nitrogen atoms.

7. The telecommunication cable according to claim 6, wherein said two nitrogen atoms are included in two respective amide moieties of the formula —CO—NH—.

8. The telecommunication cable according to claim 1, wherein the amount of copolymer is about 50% to about 95% of the total weight of the polymeric composition.

9. The telecommunication cable according to claim 1, wherein the amount of copolymer is about 60% to 85% of the total weight of the polymeric composition.

10. The telecommunication cable according to claim 1, wherein said plasticizer is present in an amount of 5 to 30 parts by weight per hundred parts by weight of the copolymer.

11. The telecommunication cable according to claim 1, wherein said plasticizer is present in an amount of 10 to 25 parts by weight per hundred parts by weight of the copolymer.

12. The telecommunication cable according to claim 1, wherein said stabilizer compound is a compound of formula I:

$$R^2\text{—}X^1\text{—}R^1\text{—}X^2\text{—}R^3 \qquad (I)$$

wherein
$R^1$ represents a linear or branched $C_1$-$C_{10}$ alkylene, optionally substituted with one or two groups selected from alkyl substituted or unsubstituted phenyl, benzyl or hydroxyphenyl;
$X^1$ and $X^2$ each independently represent a moiety comprising a heteroatom-bonded hydrogen selected from —NH—, —CO—NH—, —CH(OH)— or —CH(SH)—; and
each of $R^2$ and $R^3$ independently represent a linear or branched $C_1$-$C_{10}$ alkyl, optionally substituted with a group selected from alkyl substituted or unsubstituted phenyl, benzyl or hydroxyphenyl.

13. The telecommunication cable according to claim 12, wherein $R^2$ and $R^3$ each independently represent a moiety of formula (II):

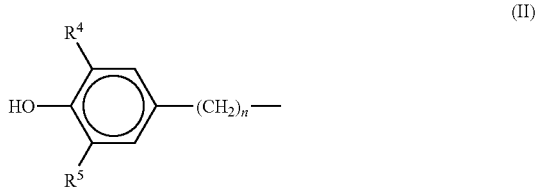

wherein $R^4$ and $R^5$ independently represent a $C_1$-$C_6$ linear or branched alkyl moiety, and n is an integer from 1 to 6.

14. The telecommunication cable according to claim 12, wherein said heteroatom moieties $X_1$ and $X_2$ are amide groups of the formula —CO—NH—.

15. The telecommunication cable according to claim 1, wherein said stabilizer compound is N,N'-hexane-1,6-diylbis [3-(3,5-di-tert-butyl-4-hydroxyphenyl) propionamide].

16. The telecommunication cable according to claim 1, wherein said stabilizer compound is of formula (III):

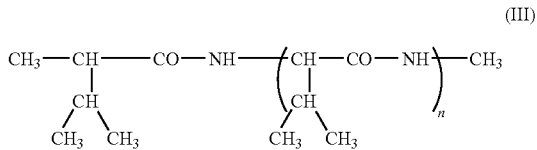

where n is an integer from 1 to 5.

17. The telecommunication cable according to claim 1, wherein said copolymer has a hydrolysis degree of about 70% to about 92%.

18. The telecommunication cable according to claim 1, wherein said elongated element containing at least one transmitting element is a tubular element comprising at least one sheath made from said water-soluble polymeric composition.

19. The telecommunication cable according to claim 18, wherein said tubular element comprises a double layer sheath in which the inner sheath is made from said water-soluble polymeric composition and the outer sheath is made from a water-insoluble polymer material.

20. The telecommunication cable according to claim 18, wherein said tubular element further comprises a third outer sheath made from said water-soluble polymeric composition.

21. The telecommunication cable according to claim 1, wherein said elongated element is a grooved core comprising at least one groove longitudinally disposed on the outer surface of said core and housing said at least one transmitting element.

22. The telecommunication cable according to claim 1, wherein the distance between the two hydrogen atoms is $4.5 \times 10^{-10}$ m to $5.5 \times 10^{-10}$ m.

23. The telecommunication cable according to claim 12, wherein the linear or branched $C_1$-$C_{10}$ alkylene of $R^1$ is substituted with one or two groups selected from alkyl, substituted or unsubstituted phenyl, benzyl or hydroxyphenyl.

24. The telecommunication cable according to claim 12, wherein the linear or branched $C_1$-$C_{10}$ alkyl of $R^2$ and $R^3$ is substituted with a group selected from alkyl, substituted or unsubstituted phenyl, benzyl or hydroxyphenyl.

25. The telecommunication cable according to claim 13, wherein the $C_1$-$C_6$ linear or branched alkyl moiety is t-butyl.

26. The telecommunication cable according to claim 13, wherein n is 2.

27. The telecommunication cable according to claim 1, wherein the vinyl alcohol/vinyl acetate copolymer exhibits a saponification number of about 108 to about 114.

28. The telecommunication cable according to claim 27, wherein the vinyl alcohol/vinyl acetate copolymer exhibits a variation of saponification number of less than about 6.5% after subjecting said copolymer to a relative humidity of about 50% at a temperature of about 85° C. for about 30 days.

* * * * *